United States Patent [19]

Beger et al.

[11] 4,019,757
[45] Apr. 26, 1977

[54] FOLDABLE PRAM CHASSIS

[75] Inventors: Udo Beger, Landshut, Germany; Gabriel Saillard; Ari Pasquini, both of Cholet, France

[73] Assignee: Etablissements Morellet-Guerineau GmbH & Co. Handels KG, Munich, Germany

[22] Filed: Aug. 14, 1975

[21] Appl. No.: 604,731

[30] Foreign Application Priority Data

Aug. 31, 1974 Germany .......................... 2441870

[52] U.S. Cl. .............................................. 280/649
[51] Int. Cl.² ........................................ B62B 11/00
[58] Field of Search ............ 280/36 C, 41 A, 41 B, 280/39, 40, 42, 649

[56] References Cited

UNITED STATES PATENTS

| 3,222,081 | 12/1965 | Harmon | 280/36 B |
| 3,504,926 | 4/1970 | Glaser | 280/41 A |
| 3,692,323 | 9/1972 | Seking | 280/41 B |
| 3,836,164 | 9/1974 | Sugino | 280/41 A |

*Primary Examiner*—Robert A. Song
*Attorney, Agent, or Firm*—Allison C. Collard

[57] ABSTRACT

A foldable pram chassis in which two lateral X-shaped frames are connected articularly with two horizontal carriage body and seat fixing struts, a U-shaped plate articulated to the lateral X-shaped frames and a rectangular slide frame, cross-struts of which are foldable so that the chassis may be collpased, the rectangular slide frame pivots in the U-shaped plate and lying over the carriage body and seat fixing struts.

9 Claims, 7 Drawing Figures

FOLDABLE PRAM CHASSIS

BACKGROUND OF THE INVENTION

The invention relates to a foldable pram chassis with two lateral X-shaped frames made of two articularly connected struts with two horizontal carriage body and seat fixing struts and with a U-shaped plate connected articularly to the lateral frames.

Pram chassis are known which are foldable only in vertical direction and have two lateral X-shaped frames made of two pivotally connected struts which are connected at their upper ends by means of horizontal struts. These horizontal struts serve, according to the type of pram, for the fixing of a carriage body or a seat. The upper ends of one strut of the lateral frames are connected by means of a U-shaped slider.

From German Specification No. 1,199,629 a foldable pram is known, the chassis of which consists of an X-shaped frame having two pivotally connected struts and two V-shaped struts connected pivotably to this frame. The two V-shaped struts are connected pivotably at the apex and run out at the apex into two slide parts. The X-shaped frame and the V-shaped connective struts carry wheels at their lower end. At the upper end of the X-shaped frame a seat is arranged. This chassis has the drawback that its slidability is only very low and that the maximum length between the slide and the V-shaped connected struts and their wheels, cannot be reduced.

From German Models Patent No. 1,947,820 a foldable chassis for childrens carriages is known which is foldable in vertical direction and also in crosswise direction. This chassis has an X-shaped basic frame made of two pivotably connected struts, two slide parts, which are connected to the basic frame foldably and at the lower end. For the reinforcing in vertical direction, the upper sections of the slide parts and the basic frame are connected by means of a further X-shaped frame made of two pivotably connected struts. The seat is fixed to the upper sections of a slide part and rails which are disposed between the basic frame and the lower sections of the slide parts. This known chassis is suitable only for childrens carriages. As the slide consists of two non-connected parts it is difficult to maintain the direction of travel of the pram if it is only held on one slide part.

From German Patent Specification No. 2,300,435 a frame for a childs carriage foldable in vertical direction and in cross-wise direction is known which has a continuous slide, the slide grip of which is foldable inwards in the middle.

From German Patent Specification No. 492,027 a pram chassis foldable in vertical and in cross-wise direction is known having two lateral X-shaped frames which are connected at the bottom by an X-shaped basic frame and at the top by a seat, arm supports, and a slide. For the folding of the pram chassis the seat is foldable in the middle and the slide may be divided into two parts. For the folding of the pram chassis the two slide parts are folded forwards.

At the same time however, it is necessary to fold the seat upwards, that is a lateral pressure must be exercised. Thereby, the folding procedure is relatively complicated.

From German Patent Specification No. 2,300,435 a chassis foldable in vertical section and in cross-wise section is known which has a continuous slide, the sliding grip of which is foldable inwards in the middle. The chassis however is applicable exclusively to childrens carriages.

SUMMARY OF THE INVENTION

The invention is based on the problem of providing a pram chassis foldable in vertical direction and in crosswise direction which is suitable for a conventional pram with carriage body and also for a childrens carriage.

This problem is solved according to the invention by providing a foldable pram chassis having two lateral X-shaped frames consisting of two struts connected articularly with two horizontal carriage body and seat fixing struts and with U-shaped plates connected articularly to the lateral frames, a rectangular slide frame, the cross-struts of which are foldable in the middle, the upper cross strut forming a handle grip, longitudinal struts and the lateral frames, being rotatable about an axis by means of the U-shaped plates, said longitudinal struts, horizontal fixing struts and the lateral frames being connected pivotably in longitudinal direction of the pram.

An essential advantage of the chassis according to the invention consists in that the slide frame gives it a higher degree of stability.

By means of the invention, a chassis is thus provided which has horizontal fixing struts for a carriage body or a seat and also a continuous slide. Upon folding the chassis the slide frame is tilted forwards. With a simple rotating bearing of the longitudinal struts of the slide frame, the longitudinal struts are turned such that the slide frame is folded inwards and thereby the size of the chassis is reduced.

The lateral frames are suitably connected by means of an X-shaped base frame made of two articularly connected struts.

The longitudinal struts of the slide frame are rotatably mounted in the U-shaped plates, one strut of each X-shaped lateral frame being linked to the respective U-shaped plate.

The rotary bearing of the longitudinal struts of the slide frame may be affected by means of pins on the longitudinal struts of the slide frame which are guided in the direction of rotation in cross-wise grooves of the plate.

A guided rotation of the longitudinal struts of the slide frame may be affected by means of curved stirrups on the longitudinal struts in the regions of the lateral frames whereby upon folding the frame the stirrups come into contact with the lateral frames and a rotation of the longitudinal strut of the slide frame is effected.

A guided rotation of the longitudinal struts of the slide frame may be effected in that on each longitudinal strut there is a pin which is guided in a groove in the plate, which groove is inclined to the longitudinal axis of the longitudinal strut.

Alternatively for the guided rotation of the longitudinal struts of the slide frame a toothed wheeled gearing inside the plate may also be used in that it consists of the toothed wheel with bevel teeth fixed on the upper end of a strut of one X-shaped lateral frame and a toothed wheel with bevelled teeth in engagement with this which fits on one longitudinal strut of the slide frame.

The rotational and pivoting bearing of the longitudinal struts of the slide frame is suitably such that a rotation of about 90° and a pivoting of about 171° is achieved. In such a rotation and pivoting range it can be achieved that the longitudinal struts of the slide frame in the folded state of the chassis run approximately horizontally and the halves of the cross-struts of the slide frame do not lie on the ground.

DESCRIPTION RELATING TO THE DRAWINGS

Figure 1:
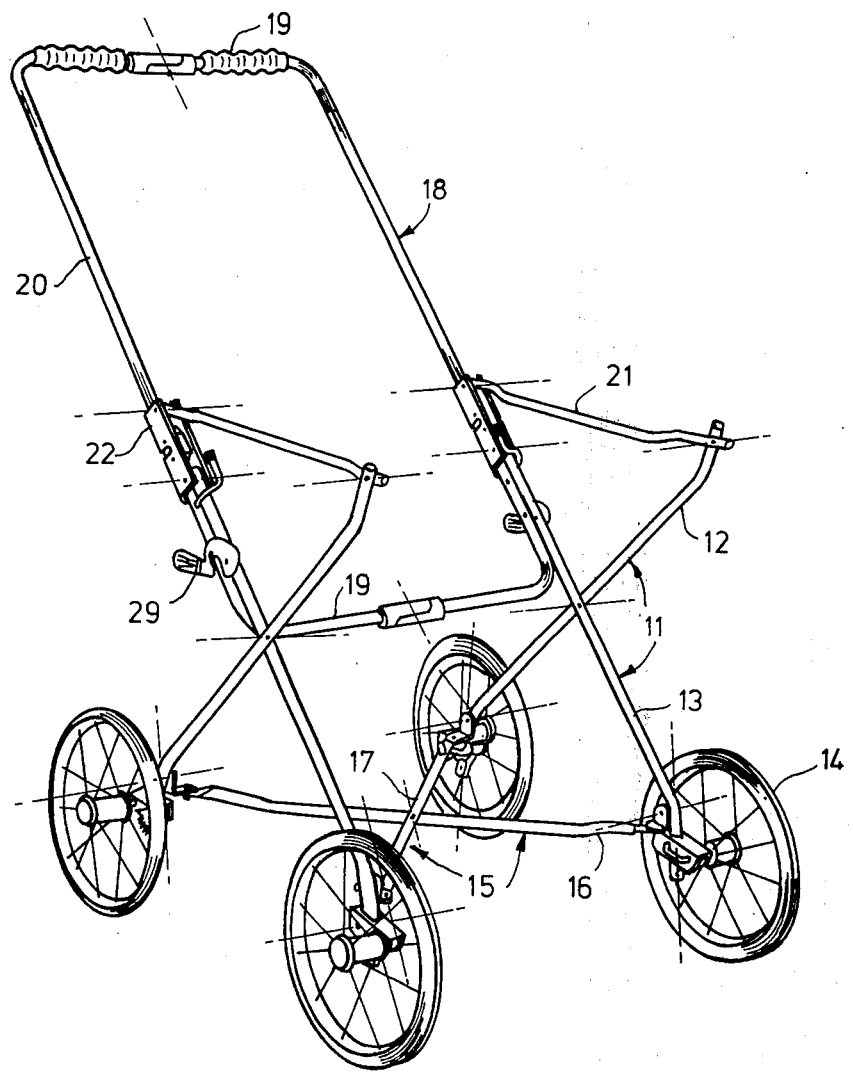
FIG. 1 shows a perspective representation of the chassis in the non-folded state.
Figure 2:
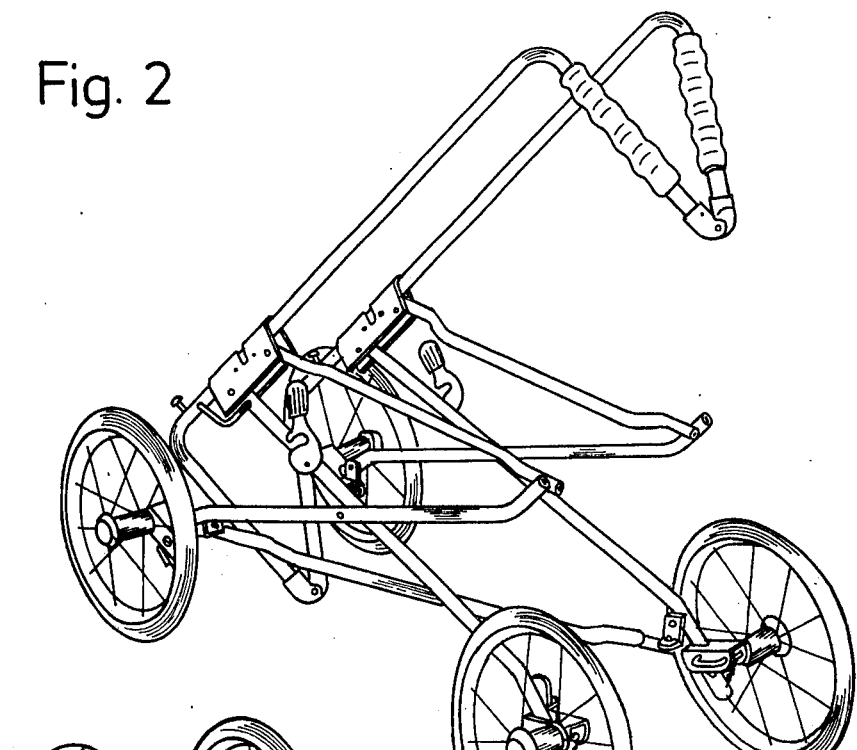
FIG. 2 shows the chassis in a middle position.
Figure 3:
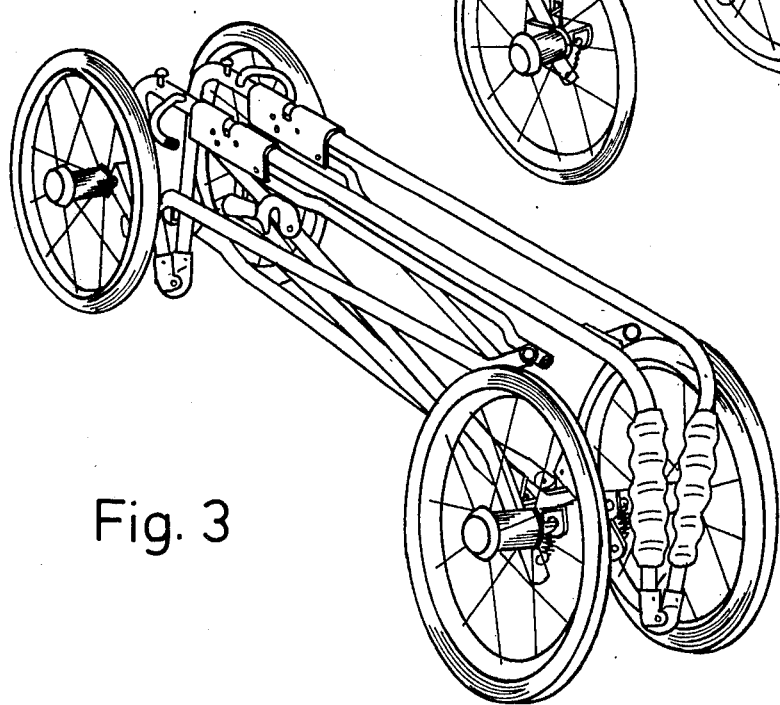
FIG. 3 shows the chassis in the folded state.

The foldable chassis consists of two lateral frames 11, having two pivotably connected struts 12 and 13. The lateral frames are connected at the lower ends of their struts by means of a basic frame 15 with two pivotably connected struts 16 and 17. On the lower ends of the struts of the lateral frame wheels 14 are fixed. A rectangular slide frame 18 with cross-struts 19 and longitudinal struts 20 is connected by means of a connecting part 22 to horizontal struts 21 and one strut 13 of the lateral frame 11. The cross struts 19 of the slide frame 18 are foldable in the middle such that the slide frame is foldable forwards in the direction of travel. The upper cross-strut 19 serves as a slide grip.

The connecting part 22 consists of a U-shaped plate on the legs 23 of which the horizontal struts 21 and the struts 13 of the lateral frame 11 are pivotably fixed.

Figure 4:
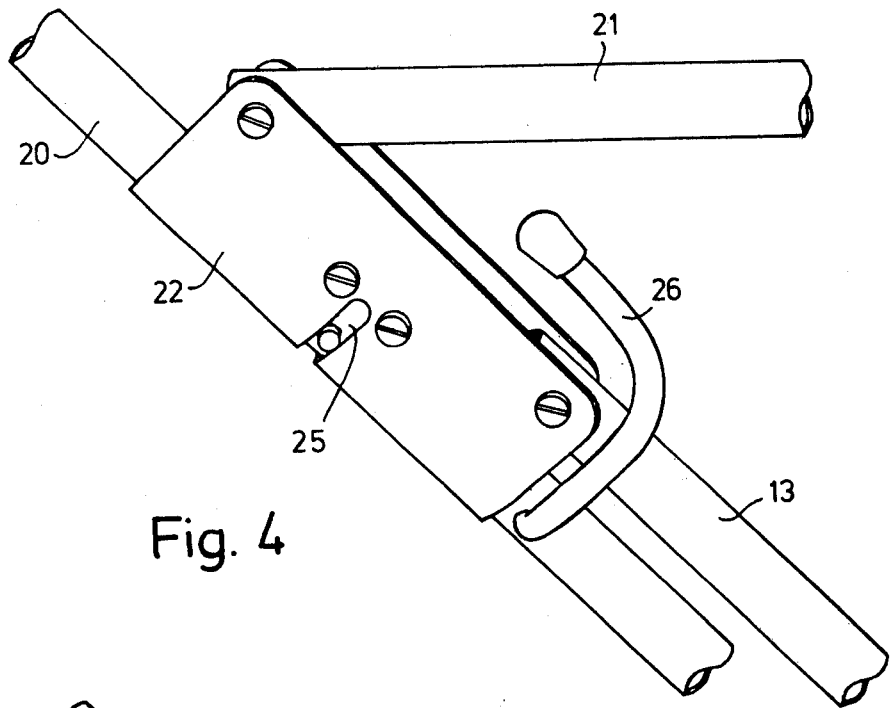
FIG. 4 shows on a larger scale the connecting part.
Figure 5:
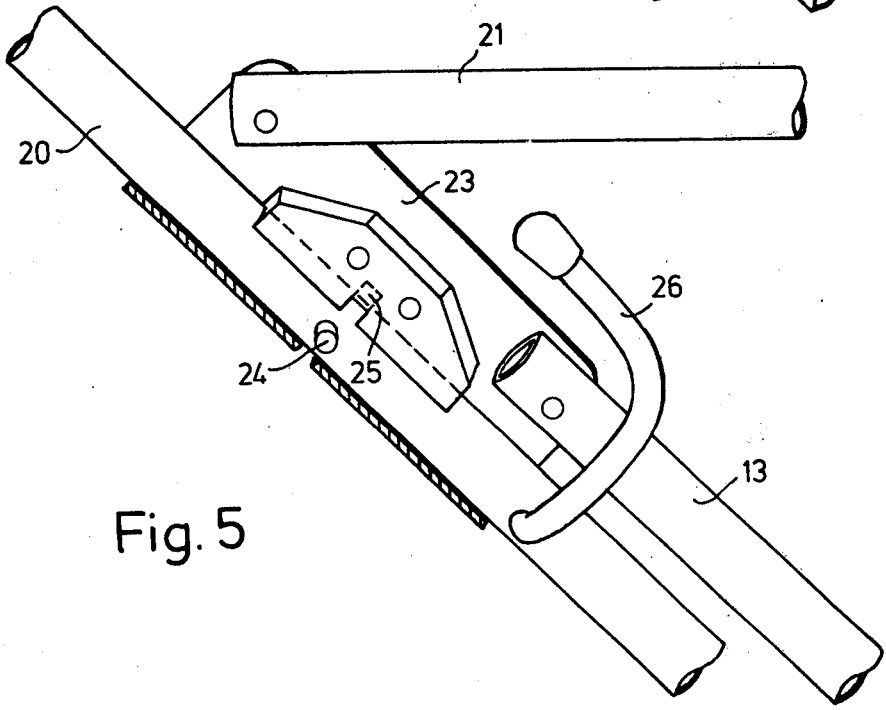
FIG. 5 shows a longitudinal section through the connection part.

The horizontal struts serve for the fixing of a carriage body or a seat and are articularly connected at their end to the struts 12 of the lateral frames. The longitudinal struts 20 of the slide frame 18 are rotatably mounted in the plate 22. As FIGS. 4 and 5 show the rotational bearing is effective in that on each longitudinal strut a pin 24 is fixed which is guided in a cross-wise groove 25 of the plate 22.

The guided rotation of the longitudinal struts on forward folding of the slide frame 20 is effected by a curved stirrup 26 on each longitudinal strut 20 of the slide frame 18. As soon as the slide frame 18 is folded forwards the stirrup 26 strikes one strut 13 of the lateral frame 11 and effects the rotation of the longitudinal strut in the desired direction.

Figure 6:
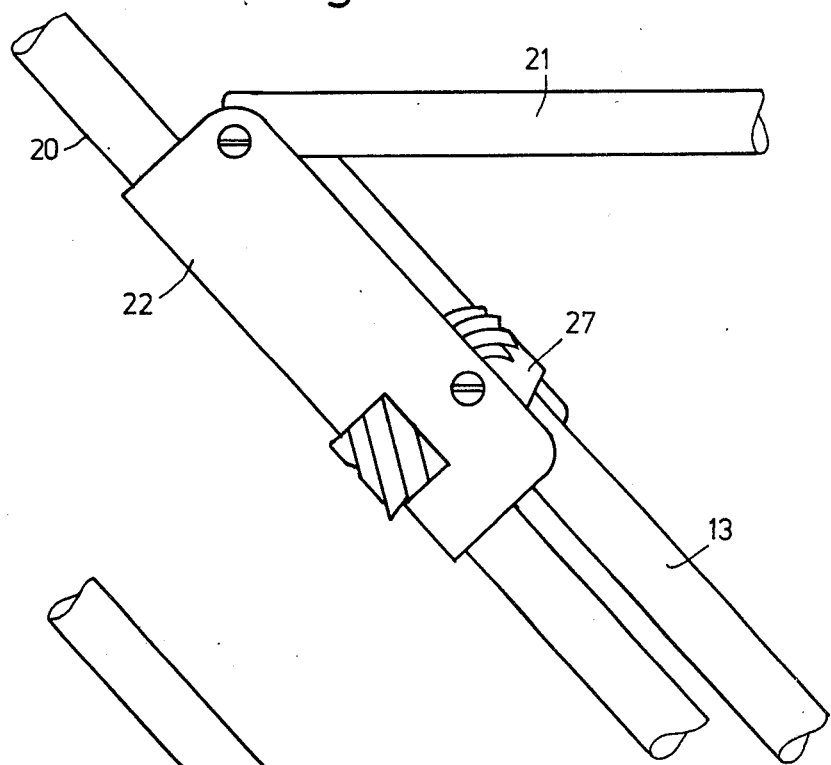
FIG. 6 shows a perspective representation of the connecting part with a tooth wheel gear.
Figure 7:
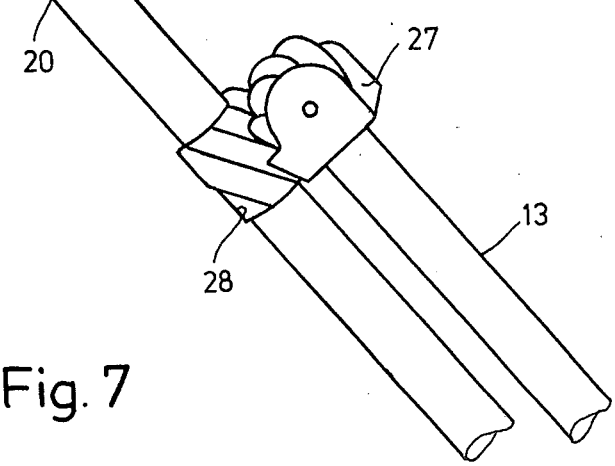
FIG. 7 shows a perspective representation of the toothed wheel gear.

The rotation of the longitudinal struts 20 of the slide frame 18 may alternatively be effected by means of a toothed wheel gear shown in FIGS. 6 and 7. This gear is disposed in each plate 22 and consists of a toothed wheel 27 with bevelled teeth which is fixed at the end of one strut 13 of the lateral frame 11 and a toothed wheel 28 with bevelled teeth in engagement with this which is located on the longitudinal strut 20 of the slide frame 18. The two toothed wheels may be made suitably of synthetic material.

A guided rotation of the longitudinal struts 20 of the slide frame 18 may be effected in that the groove 25 in the plate 22 does not run cross-wise but obliquely to the longitudinal axis of the longitudinal strut. In this case the stirrup may be dispensed with.

The rotary and pivoting range of the longitudinal struts 20 of the slide frame 18 is suitably so selected that a rotary movement of 90° and a pivoting movement of 171° is possible. Under these conditions it may be achieved that in the folded state of the chassis the longitudinal struts run approximately for example horizontally and the halves of the cross-struts of the slide frame do not lie on the ground.

The locking of the chassis in the erected state is effected in the usual manner by lateral levers 29, which are pivoted on the lateral frames 11 and which connect the lateral frames 11 to the slide frame 18.

We claim:

1. A foldable pram chassis comprising:
   two horizontal carriage body and seat fixing struts, said struts each having a forward end and a rearward end;
   two lateral X-shaped frames each including two struts each having an upper end, a respective one of the upper ends of one of said two last-mentioned struts being pivotally connected with a respective one of said forward ends of said two horizontal carriage body and seat fixing struts;
   U-shaped plates, one for each said lateral X-shaped frames connected articularly thereto, each of the upper ends of the other of said lateral X-shaped frame struts being pivotally connected with a respective one of said U-shaped plates;
   a rectangular slide frame having upper and lower cross-struts each foldable in the middle thereof, the upper cross strut forming a handle grip, said slide frame including longitudinal struts, said fixing struts and said lateral frames, being rotatably mounted about an axle by means of said U-shaped plates; and,
   said longitudinal struts and said upper ends of said other of said lateral X-shaped frame struts including operatively associated rotational and pivotal means; whereby said longitudinal struts, said fixing struts and said other of said lateral X-shaped frame struts being pivotal in a longitudinal direction of the pram chassis, and said longitudinal and said other of said lateral X-shaped frame struts being rotatable relative to each other about said longitudinal direction of the pram chassis.

2. A chassis according to claim 1, including an X-shaped base frame comprising two articularly connected struts connected said two lateral X-shaped frames.

3. A chassis according to claim 1, wherein said rotational and pivotal means rotatably mounts the longitudinal struts of the slide frame in said U-shaped plates.

4. A chassis according to claim 1, further comprising a pin on each of the longitudinal struts of said slide frame, said U-shaped plates are formed with cross-grooves, respectively, said pins are guided in a direction of rotation in said cross-grooves of the U-shaped plates, respectively.

5. A chassis according to claim 1, further comprising a curved stirrup means on each longitudinal strut of said slide frame in regions of said lateral frame, said stirrup means upon folding of the chassis for contacting said lateral frames and effecting a rotation of said longitudinal struts of the slide frame.

6. A chassis according to claim 1, further comprising a pin on each of said longitudinal struts of said slide frame, groove means in said U-shaped plates running inclined to the longitudinal axis of the longitudinal strut for guiding said pins therein.

7. A chassis according to claim 1, wherein said rotational and pivotal means comprises a toothed gear means for the rotational bearing of each of said longitudinal struts of said slide frame, said toothed gear means each consisting of a first toothed wheel with bevelled teeth fixed on an upper end of said other strut of said lateral X-shaped frame and a second toothed wheel with bevelled teeth in engagement with said first toothed wheel, said second toothed wheel is fixed on the longitudinal strut of the slide frame.

8. A chassis according to claim 7, wherein the toothed wheels are composed of synthetic material.

9. A chassis according to claim 1, wherein the longitudinal struts of the slide frame are rotatable through approximately 90° and are pivotable through 171°.